United States Patent
You

(10) Patent No.: US 11,379,357 B2
(45) Date of Patent: Jul. 5, 2022

(54) STORAGE DEVICE AND METHOD OF OPERATING THE SAME

(71) Applicant: SK hynix Inc., Icheon-si (KR)

(72) Inventor: Byoung Sung You, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 17/088,380

(22) Filed: Nov. 3, 2020

(65) Prior Publication Data

US 2021/0382819 A1 Dec. 9, 2021

(30) Foreign Application Priority Data

Jun. 5, 2020 (KR) .................. 10-2020-0068098

(51) Int. Cl.
| | | |
|---|---|---|
| *G06F 12/02* | (2006.01) | |
| *G06F 12/0882* | (2016.01) | |
| *G06F 13/16* | (2006.01) | |
| *G06F 9/30* | (2018.01) | |
| *G06F 12/0811* | (2016.01) | |

(52) U.S. Cl.
CPC ...... *G06F 12/0246* (2013.01); *G06F 9/30101* (2013.01); *G06F 12/0811* (2013.01); *G06F 12/0882* (2013.01); *G06F 13/1673* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 10,854,290 | B1* | 12/2020 | Wu | .................. G11C 7/1072 |
| 2008/0195802 | A1* | 8/2008 | Lee | .............. G06F 12/0246 |
| | | | | 711/103 |
| 2014/0143476 | A1* | 5/2014 | Sela | ................ G06F 3/0619 |
| | | | | 711/103 |
| 2015/0248244 | A1* | 9/2015 | Seo | .................. G06F 3/0611 |
| | | | | 711/103 |
| 2015/0347026 | A1* | 12/2015 | Thomas | ............. G06F 3/064 |
| | | | | 711/103 |
| 2015/0347314 | A1* | 12/2015 | Lee | ................ G06F 12/1009 |
| | | | | 711/103 |
| 2019/0073295 | A1* | 3/2019 | Lee | .................. G06F 3/0652 |
| 2019/0114272 | A1* | 4/2019 | Dubey | .............. G06F 13/1694 |
| 2019/0332298 | A1* | 10/2019 | Madabhushi | .......... G06F 3/064 |
| 2020/0089617 | A1* | 3/2020 | Onishi | ............... G06F 12/1009 |

FOREIGN PATENT DOCUMENTS

| | | |
|---|---|---|
| KR | 1020180034842 A | 4/2018 |
| KR | 1020190040614 A | 4/2019 |

* cited by examiner

*Primary Examiner* — Yaima Rigol
(74) *Attorney, Agent, or Firm* — William Park & Associates Ltd.

(57) ABSTRACT

The present disclosure relates to a storage device and a method of operating the same. The storage device includes a memory device including a memory cell array that stores normal data and map data, and a memory controller configured to control overall operation, including program operation, read operation, and erase operation, of the memory device in response to requests from a host. The memory device is configured to, during a map data load operation, transmit first map data to the memory controller by reading the first map data among the map data stored in the memory cell array, and transmit second map data to a page buffer group of the memory device by reading the second map data among the map data.

20 Claims, 18 Drawing Sheets

STORAGE DEVICE AND METHOD OF OPERATING THE SAME

CROSS-REFERENCE TO RELATED APPLICATION

The present application claims priority under 35 U.S.C. § 119(a) to Korean patent application number 10-2020-0068098 filed on Jun. 5, 2020, in the Korean Intellectual Property Office, the entire disclosure of which is incorporated by reference herein.

BACKGROUND

1. Technical Field

The present disclosure relates to an electronic device, and more particularly, to a storage device and a method of operating the storage device.

2. Related Art

A storage device is a device that stores data under the control of a host device such as a computer or a smartphone. A storage device may include a memory device in which data is stored and a memory controller controlling the memory device. The memory device may be a volatile memory device or a non-volatile memory device.

A volatile memory device is a device that stores data only when power is supplied and loses the stored data when the power supply is cut off. Volatile memory devices include, for example, static random access memory (SRAM), dynamic random access memory (DRAM), and the like.

A non-volatile memory device is a device that does not lose data even though power is cut off. Non-volatile memory devices include, for example, read only memory (ROM), programmable ROM (PROM), electrically programmable ROM (EPROM), electrically erasable and programmable ROM (EEPROM), flash memory, and the like.

SUMMARY

An embodiment of the present disclosure is directed to a storage device capable of increasing a loading capacity of map data and an improved operation speed, and a method of operating the storage device.

A storage device according to an embodiment of the present disclosure includes a memory device including a memory cell array that stores normal data and map data, and a memory controller configured to control overall operation, including program operation, read operation, and erase operation, of the memory device in response to requests from a host. The memory device is configured to, during a map data load operation, transmit first map data to the memory controller by reading the first map data among the map data stored in the memory cell array, and transmit second map data to a page buffer group of the memory device by reading the second map data among the map data.

A method of operating a storage device according to an embodiment of the present disclosure includes: reading first map data and second map data among map data stored in a system block of a memory cell array; transmitting the first map data to a memory controller, storing the first map data in a memory buffer of the memory controller, and storing the second map data in a page buffer group; and performing a map data search operation of searching whether search map data corresponding to a received logical block address is included in the second map data, when the logical block address is received from the memory controller to the page buffer group.

A method of operating a storage device according to an embodiment of the present disclosure includes: storing first map data among map data stored in a system block in a memory controller, and storing second map data among the map data in a page buffer group of the memory device, during a map data load operation; receiving a logical block address from the memory controller by the memory device, and searching whether search map data corresponding to the received logical block address is included in the second map data, during a map data search operation; receiving normal data and the logical block address from the memory controller by the memory device, storing the normal data in a memory cell array, and then leave remaining map data corresponding to the logical block address among the second map data in the page buffer group, during a data program operation; and storing the map data left remaining in the page buffer group, in the memory cell array during a map data flush operation.

DETAILED DESCRIPTION

Specific structural or functional descriptions of embodiments according to the concept which are disclosed in the present specification or application are illustrated only to describe the embodiments according to the concept of the present disclosure. The embodiments according to the concept of the present disclosure may be carried out in various forms and the descriptions are not limited to the embodiments described in the present specification or application.

Hereinafter, the present disclosure will be described in detail by describing an embodiment of the present disclosure with reference to the accompanying drawings. Hereinafter, an embodiment of the present disclosure will be described in detail with reference to the accompanying drawings.

Figure 1:
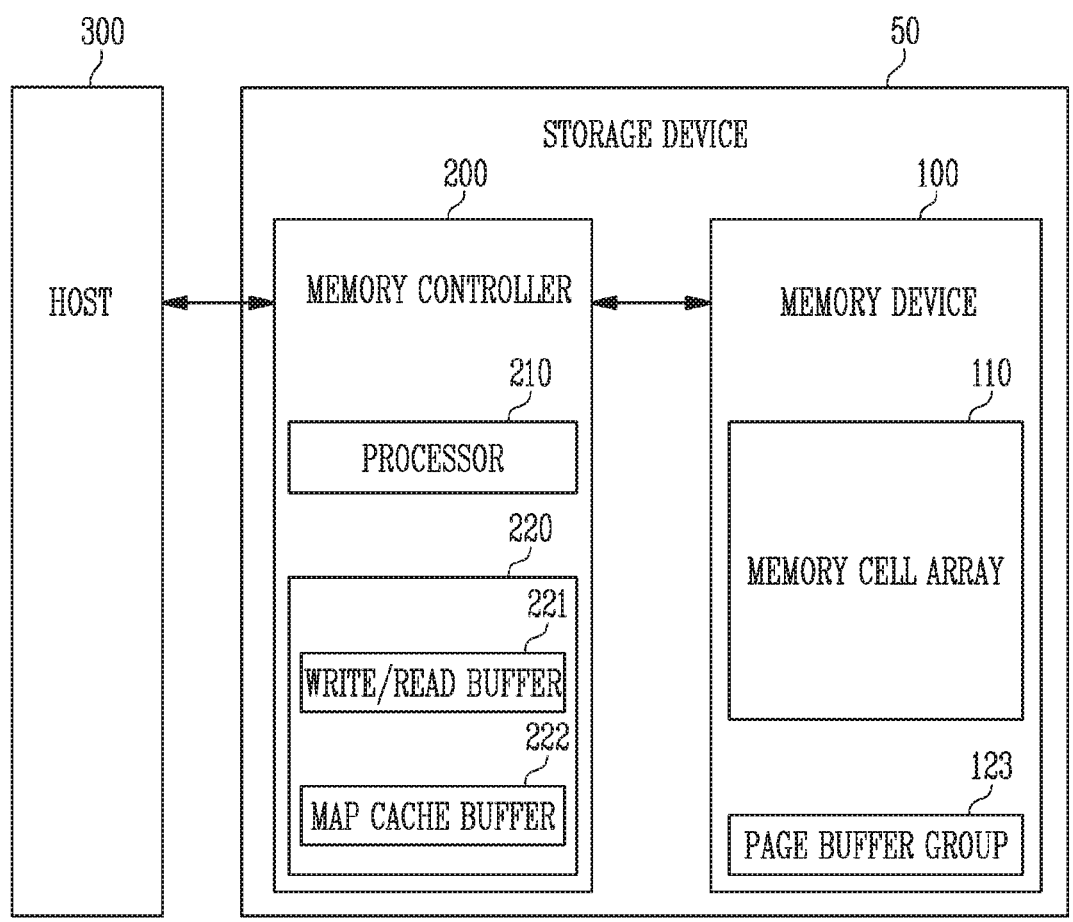
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 that controls an operation of the memory device. The storage device 50 is a device that stores data under the control of a host 300 such as a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method with the host 300. For example, the storage device 50 may be configured as any of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-E) card type storage device, a compact flash (CF) card, a smart media card, and a memory stick.

The storage device 50 may be manufactured as any of various types of packages. For example, the storage device 50 may be manufactured as any of various types of package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store normal data and map data. Normal data, for example, is data associated with the routine operation of an apparatus in which the memory device 100 is included. Map data is data that indicates how the normal memory is laid out in the memory device 100. The memory device 100 operates under the control of the memory controller 200. The memory device 100 may include a memory cell array 110 including a plurality of memory cells that store the normal data and the map data.

Each of the memory cells may be configured as a single-level cell (SLC) storing one data bit, a multi-level cell (MLC) storing two data bits, a triple-level cell (TLC) storing three data bits, or a quad-level cell (QLC) storing four data bits.

The memory cell array 110 may include a plurality of memory blocks. Each memory block may include a plurality of memory cells. One memory block may include a plurality of pages. In an embodiment, a page may be a unit for storing data in the memory device 100 or reading data stored in the memory device 100. A memory block may be a unit for erasing data. In an embodiment, the memory device 100 may include double data rate synchronous dynamic random access memory (DDR SDRAM), low power double data rate4 (LPDDR4) SDRAM, graphics double data rate (GDDR) SDRAM, low power DDR (LPDDR), Rambus dynamic random access memory (RDRAM), NAND flash memory, vertical NAND flash memory, a NOR flash memory device, resistive random access memory (RRAM), phase-change memory (PRAM), magnetoresistive random access memory (MRAM), ferroelectric random access memory (FRAM), spin transfer torque random access memory (STT-RAM), or the like. In the present specification, for convenience of description, it is assumed that the memory device 100 includes NAND flash memory.

The memory device 100 is configured to receive a command and an address from the memory controller 200 and access a region selected by the address of the memory cell array. That is, the memory device 100 may perform an operation based on a command on the region selected by the address. For example, the memory device 100 may perform a write operation (program operation), a read operation, and an erase operation. During the program operation, the memory device 100 may program data to the region selected by the address. During the read operation, the memory device 100 may read data from the region selected by the address. During the erase operation, the memory device 100 may erase data stored in the region selected by the address.

In an embodiment, the memory device 100 may include a page buffer group 123. During the program operation, the page buffer group 123 receives and temporarily stores data to be programmed, and then stores the temporarily stored data in the memory cell array 110. In addition, during the read operation, the page buffer group 123 reads the data stored in the memory cell array 110 and outputs the read data to the memory controller 200. In addition, the page buffer group 123 may read and store the map data stored in the memory cell array 110. The page buffer group 123 may perform an operation of searching map data corresponding to a logical block address (LBA) among the stored map data by receiving the LBA from the memory controller 200.

The memory controller 200 controls an overall operation of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive the map data from the memory device 100 and store the map data. In an embodiment, the memory controller 200 may receive data and a logical block address (LBA) from the host 300 and convert the LBA into a physical block address (PBA) indicating an address of memory cells in which data included in the memory device 100 is to be stored, using the map data.

The memory controller 200 may control the memory device 100 to perform the program operation, the read operation, or the erase operation in response to a request from the host 300. During the program operation, the memory controller 200 may provide a program command, the LBA, and the normal data to the memory device 100. During the read operation, the memory controller 200 may provide a read command and the PBA to the memory device 100. During the erase operation, the memory controller 200 may provide an erase command and the PBA to the memory device 100.

In an embodiment, the memory controller 200 may generate and transmit the program command, the address, and the data to the memory device 100 regardless of the request from the host 300. For example, the memory controller 200 may provide a command, an address, and data to the memory device 100 so as to perform background operations such as a program operation for wear leveling and a program operation for garbage collection.

In an embodiment, the memory controller 200 may control at least two memory devices 100. In this case, the memory controller 200 may control the memory devices 100 according to an interleaving method so as to improve operation performance. The interleaving method may be an operation method for overlapping operation periods of at least two memory devices 100.

In an embodiment, the memory controller 200 may include a processor 210 and a memory buffer 220.

The processor 210 may control an overall operation of the memory controller 200 and perform a logical operation. The processor 210 may communicate with the external host 300 and communicate with the memory device 100. In addition, the processor 210 may communicate with the memory buffer 220. The processor 210 may control an operation of the storage device 50 using the memory buffer 220 as an operation memory, a cache memory, or a buffer memory.

The processor 210 may perform a function of a flash translation layer (FTL). The processor 210 may convert a logical block address (LBA) provided from the host 300 into a physical block address (PBA) through the FTL. The FTL may convert the LBA to the PBA using mapping data. The FTL may perform an address conversion operation using a mapping table stored in the memory buffer 220.

For an embodiment, the processor 210 is configured to randomize data received from the host 300. For example, the processor 210 may randomize the data received from the host 300 using a randomizing seed. The randomized data is provided to the memory device 100 as data to be stored and programmed in the memory cell array 110.

The processor 210 is configured to de-randomize data received from the memory device 100 during the read operation. For example, the processor 210 may de-randomize the data received from the memory device using a de-randomizing seed. The de-randomized data may be output to the host 300.

As an embodiment, the processor 210 may perform randomization and de-randomization using driving software or firmware.

The memory buffer 220 may be used as operation memory, cache memory, or buffer memory of the processor 210. The memory buffer 220 may store codes and commands executed by the processor 210. The memory buffer 220 may store the map data. The memory buffer 220 may store data processed by the processor 210. The memory buffer 220 may include static RAM (SRAM) or dynamic RAM (DRAM).

The memory buffer 220 may include a write/read buffer 221 and a map cache buffer 222.

The write/read buffer 221 stores the normal data received from the host 300 during the program operation, and transmits the stored data to the memory device 100. In addition, the write/read buffer 221 stores the normal data received from the memory device 100 during the read operation, and transmits the stored data to the host 300.

The map cache buffer 222 may receive the map data from the memory device 100 and store the map data. For example, during a power-up operation of the storage device, the memory device 100 may read some of the map data stored in the memory cell array 110 and transmit the read data to the memory controller 200, and the memory controller 200 may store the map data received from the memory device 100 in the map cache buffer 222.

The host 300 may communicate with the storage device 50 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The storage device 50 according to an embodiment of the present disclosure described above may read the first map data among the map data stored in the memory cell array 110 of the memory device 100 to store the first map data in the map cache buffer 222 of the memory controller 200, and may read the second map data to store in the page buffer group 123 of the memory device 100. Therefore, a data storage capacity capable of storing the read map data may be increased.

In an embodiment, the first map data may be cold data having a relatively low number of accesses among the map data stored in the memory cell array 110, and the second map data may be hot data having a relatively high number of accesses among the map data stored in the memory cell array 110. In addition, in an embodiment, the first map data may be map data first read by a storage capacity of the map cache buffer 222 among the map data stored in the memory cell array 110, and the second map data may be map data read by a map data storage capacity of the page buffer group 123 after the first map data is read among the map data stored in the memory cell array 110.

Figure 2:
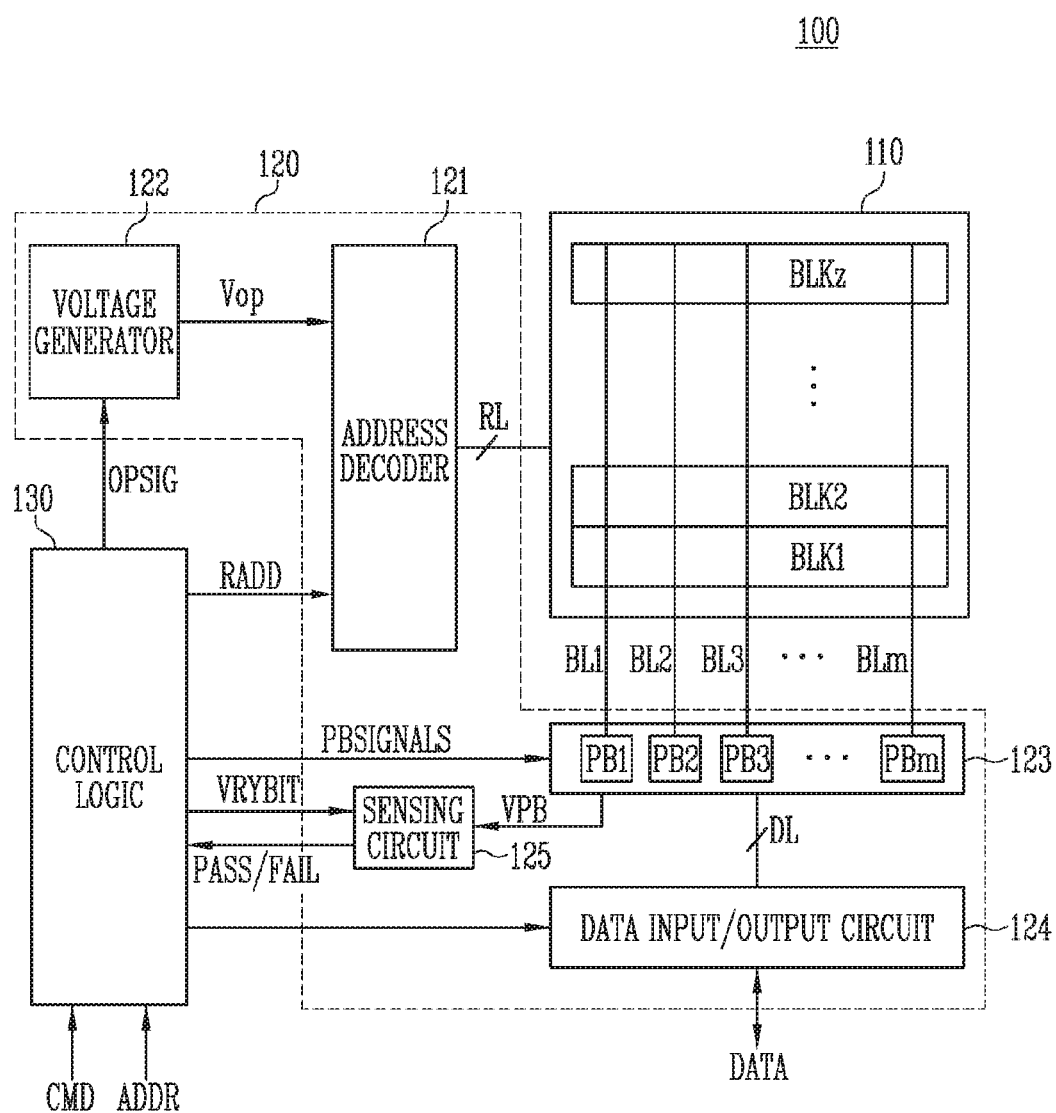
FIG. 2 is a diagram illustrating a structure of a memory device of FIG. 1.

FIG. 2 is a diagram illustrating a structure of the memory device of FIG. 1.

Referring to FIG. 2, the memory device 100 may include a memory cell array 110, a peripheral circuit 120, and control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a page buffer group 123 through bit lines BL1 to BLm. As an embodiment, at least one memory block (for example, BLK1) among the plurality of memory blocks BLK1 to BLKz may be a system block. The system block may store a read reclaim table and the map data. The map data may include a plurality of map tables. A detailed description of the map data is provided later. Each of the plurality of memory blocks BLK1 to BLKz includes a plurality of memory cells. As an embodiment, the plurality of memory cells are non-volatile memory cells. Memory cells connected to the same word line among the plurality of memory cells are defined as one page. That is, the memory cell array 110 is configured of a plurality of pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as a single-level cell (SLC) that stores one data bit, a multi-level cell (MLC) that stores two data bits, a triple-level cell (TLC) that stores three data bits, or a quad-level cell (QLC) that stores four data bits.

The peripheral circuit 120 may include an address decoder 121, a voltage generator 122, the page buffer group 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to an embodiment of the present disclosure, the row lines RL may further include a pipe select line.

The address decoder 121 is configured to operate in response to control of the control logic 130. The address decoder 121 receives an address ADDR from the control logic 130.

The address decoder 121 is configured to decode a block address of the received address ADDR. The address decoder 121 selects at least one memory block among the memory blocks BLK1 to BLKz according to the decoded block address. The address decoder 121 is configured to decode a row address RADD of the received address ADDR. The address decoder 121 may select at least one word line of the selected memory block by applying voltages provided from the voltage generator 122 to at least one word line WL according to the decoded row address RADD.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, the erase operation of the memory device 100 is performed in memory block units. The address ADDR input to the memory device 100 during the erase operation includes a block address. The address decoder 121 may decode the block address and select one memory block according to the decoded block address. During the erase operation, the address decoder 121 may apply a ground voltage to the word lines input to the selected memory block.

According to an embodiment of the present disclosure, the address decoder 121 may be configured to decode a column address of the transferred address ADDR. The decoded column address may be transferred to the page buffer group 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

As an example, the voltage generator 122 may generate an internal power voltage by regulating the external power voltage. The internal power voltage generated by the voltage generator 122 is used as an operation voltage of the memory device 100.

As an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors in response to the control logic 130 to generate the plurality of operation voltages Vop.

The plurality of generated operation voltages Vop may be supplied to the memory cell array 110 by the address decoder 121.

The page buffer group 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program pulse is applied to the selected word line, the first to m-th page buffers PB1 to PBm may transfer the data DATA to be stored, that is, the data DATA received through the data input/output circuit 124 to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained. During the program verify operation, the first to m-th page buffers PB1 to PBm read the data DATA stored in the memory cells from the selected memory cells through the bit lines BL1 to BLm.

During the read operation, the page buffer group 123 may read the data DATA from the memory cells of the selected page through the bit lines BL and store the read data DATA in the first to m-th page buffers PB1 to PBm.

During the erase operation, the page buffer group 123 may float the bit lines BL. As an embodiment, the page buffer group 123 may include a column selection circuit.

During a map data load operation, the first to m-th page buffers PB1 to PBm may read the first map data among the map data stored in the system block BLK1. The read first map data is transmitted to the memory controller 200 of FIG. 1 through the data input/output circuit 124. In addition, during the map data load operation, the first to m-th page buffers PB1 to PBm read the second map data among the map data stored in the system block BLK1, and store the read second map data. During a map data search operation, the first to m-th page buffers PB1 to PBm may search map data corresponding to the LBA received from the memory controller 200 among the stored second map data.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the normal data DATA to be stored from an external controller (not shown). During the read operation, the data input/output circuit 124 outputs the normal data DATA transferred from the first to m-th page buffers PB1 to PBm included in the page buffer group 123 to the external controller.

During the read operation or the verify operation, the sensing circuit 125 may generate a reference current in response to a signal of a permission bit VRYBIT generated by the control logic 130 and may compare a sensing voltage VPB received from the page buffer group 123 with a reference voltage generated by the reference current to output a pass signal or a fail signal to the control logic 130.

The control logic 130 may be connected to the address decoder 121, the voltage generator 122, the page buffer group 123, the data input/output circuit 124, and the sensing circuit 125. The control logic 130 may be configured to control all operations of the memory device 100. The control logic 130 may operate in response to a command CMD transferred from an external device. The control logic 130 may be implemented as hardware, software, or a combination of hardware and software. For example, the control logic 130 may be a control logic circuit operating in accordance with an algorithm and/or a processor executing control logic code.

The control logic 130 may generate various signals in response to the command CMD and the address ADDR to control the peripheral circuit 120. For example, the control logic 130 may generate an operation signal OPSIG, the row address RADD, a read and write circuit control signal PBSIGNALS, and the permission bit VRYBIT in response to the command CMD and the address ADDR. The control logic 130 may output the operation signal OPSIG to the voltage generator 122, output the row address RADD to the address decoder 121, output the read and write control signal to the page buffer group 123, and output the permission bit VRYBIT to the sensing circuit 125. In addition, the control logic 130 may determine whether the verify operation has passed or failed in response to the pass or fail signal PASS/FAIL output by the sensing circuit 125.

In an embodiment, the control logic 130 may store data received from the memory controller 200 in page buffers 123 of the page buffer group 123 under control of the memory controller 200.

The control logic 130 may program the normal data or the map data stored in the page buffers 123 of the page buffer group 123 to the memory cell array 110 under the control of the memory controller 200.

For example, when the control logic 130 receives a program command from the memory controller 200, the control logic 130 may program the normal data, which is stored in the page buffers 123 of the page buffer group 123, in the memory cell array 110 in response to the program command. When the control logic 130 receives a map data flush command from the memory controller 200, the control logic 130 may program searched map data, which is stored in the page buffers 123 of the page buffer group 123, in the system block BLK1 of the memory cell array 110 in response to the map data flush command.

The control logic 130 may read the normal data stored in the memory cell array 110 under the control of the memory controller 200. Specifically, the control logic 130 may first program the data, which is stored in the page buffers 123 of the page buffer group 123, in the memory cell array 110, and then store the data read from the memory cell array 110 in the page buffers 123 of the page buffer group 123. The control logic 130 may provide the data stored in the page buffers of the page buffer group 123 to the memory controller 200 through the data input/output circuit 124.

The control logic 130 may read the map data stored in the system block BLK1 of the memory cell array 110 under the control of the memory controller 200. Specifically, the control logic 130 may provide the first map data among the map data read from the system block BLK1 to the memory controller 200 through the data input/output circuit 124. In addition, the control logic 130 may store the second map data among the map data read from the system block BLK1.

Figure 3:
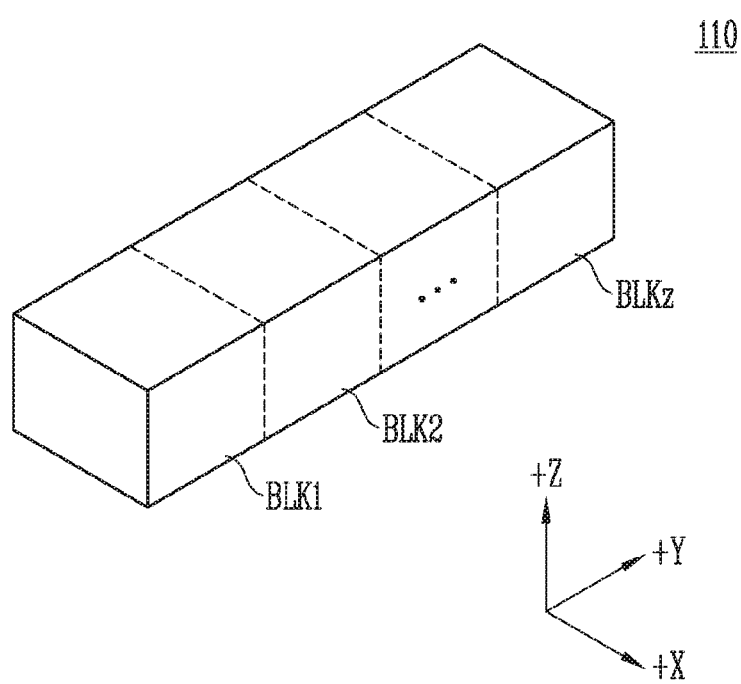
FIG. 3 is a diagram illustrating an embodiment of a memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block has a three-dimensional structure. Each memory block includes a plurality of memory cells stacked on a substrate. Such plurality of memory cells are arranged along a +X direction, a +Y direction, and a +Z direction. A structure of each memory block is described in more detail with reference to FIGS. 4 and 5.

Figure 4:
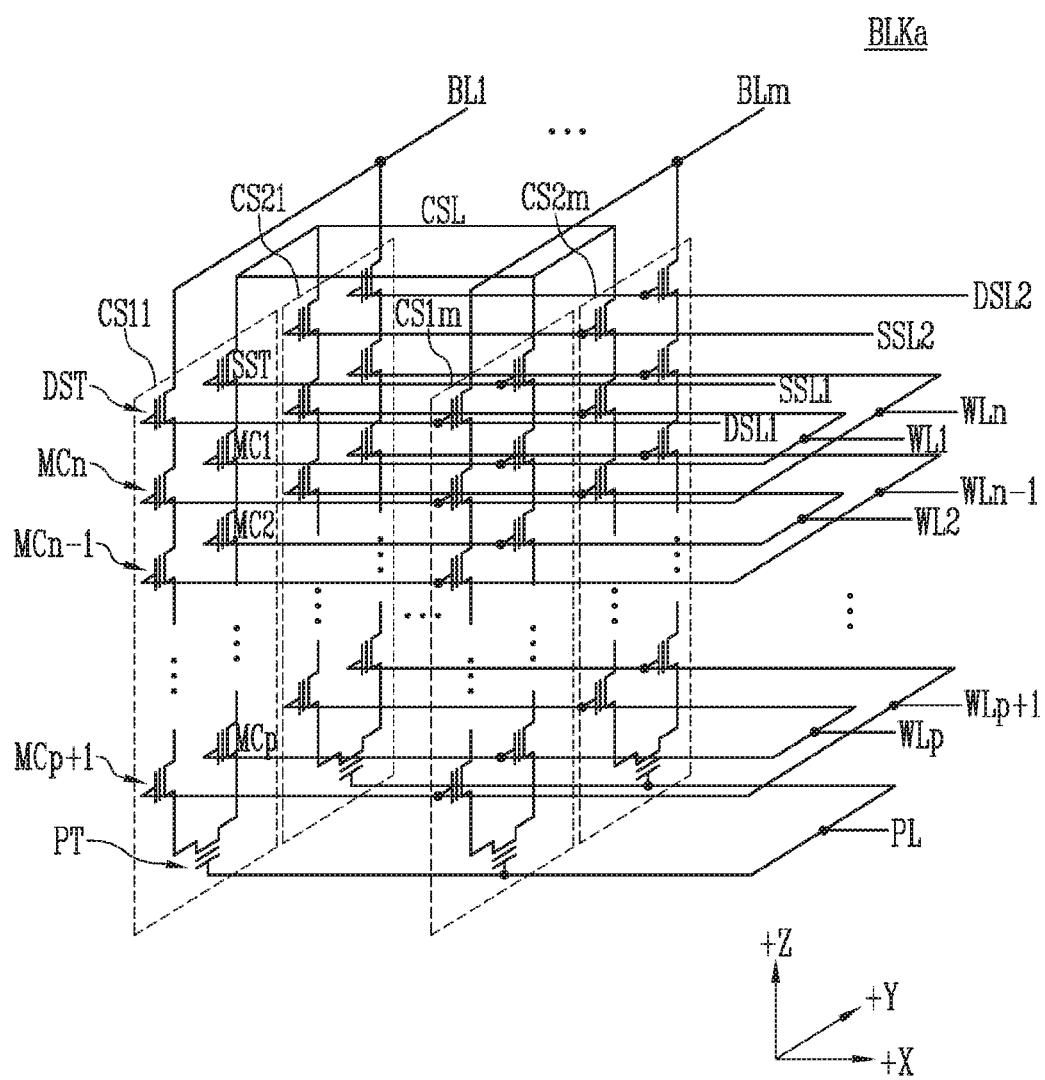
FIG. 4 is a circuit diagram illustrating a memory block BLKa of memory blocks BLK1 to BLKz of FIG. 3.

FIG. 4 is a circuit diagram illustrating a memory block BLKa of the memory blocks BLK1 to BLKz of FIG. 3.

Figure 5:
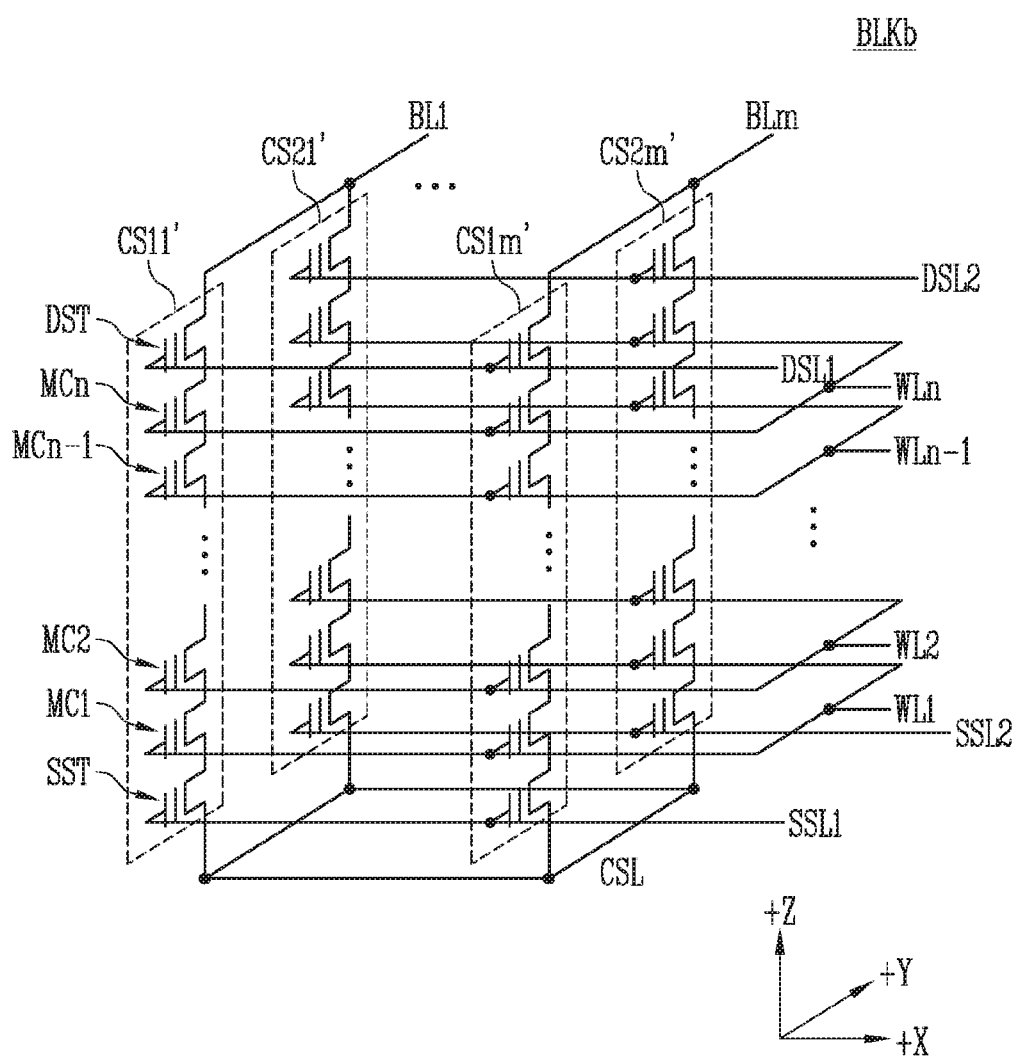
FIG. 5 is a circuit diagram illustrating another embodiment of a memory block BLKb of the memory blocks BLK1 to BLKz of FIG. 3.

Referring to FIG. 4, the memory block BLKa includes a plurality of cell strings CS11 to CS1$m$ and CS21 to CS2$m$. As an embodiment, each of the plurality of cell strings CS11 to CS1$m$ and CS21 to CS2$m$ may be formed in a 'U' shape. In the memory block BLKa, m cell strings are arranged in a row direction (that is, the +X direction). In FIG. 5, two cell strings are arranged in a column direction (that is, the +Y direction). However, this is for convenience of description and it may be understood that three or more cell strings may be arranged in the column direction.

Each of the plurality of cell strings CS11 to CS1$m$ and CS21 to CS2$m$ includes at least one source select transistor SST, first to n-th memory cells MC1 to MCn, a pipe transistor PT, and at least one drain select transistor DST.

Each of the select transistors SST and DST and the memory cells MC1 to MCn may have a similar structure. As an embodiment, each of the select transistors SST and DST and the memory cells MC1 to MCn may include a channel layer, a tunneling insulating film, a charge storage film, and a blocking insulating film. As an embodiment, a pillar for providing the channel layer may be provided in each cell string. As an embodiment, a pillar for providing at least one of the channel layer, the tunneling insulating film, the charge storage film, and the blocking insulating film may be provided in each cell string.

The source select transistor SST of each cell string is connected between a common source line CSL and the memory cells MC1 to MCp.

As an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1m of a first row are connected to a first source select line SSL1. The source select transistors of the cell strings CS21 to CS2m of a second row are connected to a second source select line SSL2.

As another embodiment, the source select transistors of the cell strings CS11 to CS1m and CS21 to CS2m may be commonly connected to one source select line.

The first to n-th memory cells MC1 to MCn of each cell string are connected between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are sequentially arranged in a direction opposite to the +Z direction, and are connected in series between the source select transistor SST and the pipe transistor PT. The (p+1)-th to n-th memory cells MCp+1 to MCn are sequentially arranged in the +Z direction, and are connected in series between the pipe transistor PT and the drain select transistor DST. The first to p-th memory cells MC1 to MCp and the (p+1)-th to n-th memory cells MCp+1 to MCn are connected to each other through the pipe transistor PT. Gates of the first to n-th memory cells MC1 to MCn of each cell string are connected to the first to n-th word lines WL1 to WLn, respectively.

A gate of the pipe transistor PT of each cell string is connected to a pipeline PL.

The drain select transistor DST of each cell string is connected between a corresponding bit line and the memory cells MCp+1 to MCn. The cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting any one of the drain select lines DSL1 and DSL2. One page of the selected cell strings may be selected by selecting any one of the word lines WL1 to WLn.

As another embodiment, even bit lines and odd bit lines may be provided instead of the first to m-th bit lines BL1 to BLm. In addition, even-numbered cell strings among the cell strings CS11 to CS1m or CS21 to SC2m arranged in the row direction may be connected to the bit lines, and odd-numbered cell strings among the cell strings CS11 to CS1m or CS21 to CS2m arranged in the row direction may be connected to odd bit lines, respectively.

As an embodiment, at least one of the first to n-th memory cells MC1 to MCn may be used as a dummy memory cell. For example, at least one dummy memory cell is provided to reduce an electric field between the source select transistor SST and the memory cells MC1 to MCp. Alternatively, at least one dummy memory cell is provided to reduce an electric field between the drain select transistor DST and the memory cells MCp+1 to MCn. As more dummy memory cells are provided, reliability of an operation for the memory block BLKa is improved, however, the size of the memory block BLKa increases. As less memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have the required threshold voltage by controlling a voltage applied to dummy word lines connected to the respective dummy memory cells.

FIG. 5 is a circuit diagram illustrating another embodiment of a memory block BLKb of the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along a +Z direction. Each of the plurality of cell strings CS11' to CS1m' and CS21' to CS2m' includes at least one source select transistor SST, first to n-th memory cells MC1 to MCn, and at least one drain select transistor DST stacked on a substrate (not shown) under the memory block BLK1'.

The source select transistor SST of each cell string is connected between a common source line CSL and memory cells MC1 to MCn. The source select transistors of the cell strings arranged in the same row are connected to the same source select line. The source select transistors of the cell strings CS11' to CS1m' arranged in a first row are connected to a first source select line SSL1. The source select transistors of the cell strings CS21' to CS2m' arranged in a second row are connected to a second source select line SSL2. As another embodiment, the source select transistors of the cell strings CS11' to CS1m' and CS21' to CS2m' may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to the n-th word lines WL1 to WLn, respectively.

The drain select transistor DST of each cell string is connected between a corresponding bit line and the memory cells MC1 to MCn. The drain select transistors of the cell strings arranged in the row direction are connected to a drain select line extending in the row direction. The drain select transistors of the cell strings CS11' to CS1m' of a first row are connected to a first drain select line DSL1. The drain select transistors of the cell strings CS21' to CS2m' of a second row are connected to a second drain select line DSL2.

As a result, the memory block BLKb of FIG. 5 has an equivalent circuit similar to the memory block BLKa of FIG. 4 except that the pipe transistor PT is excluded from each cell string.

As another embodiment, even bit lines and odd bit lines may be provided instead of the first to m-th bit lines BL1 to BLm. In addition, even-numbered cell strings among the cell strings CS11' to CS1m' or CS21' to CS2m' arranged in the row direction may be connected to even bit lines, and odd-numbered cell strings among the cell strings CS11' to CS1m' or CS21' to CS2m' arranged in the row direction may be connected to odd bit lines, respectively.

As an embodiment, at least one of the first to n-th memory cells MC1 to MCn may be used as a dummy memory cell. For example, at least one dummy memory cell is provided to reduce an electric field between the source select transistor SST and the memory cells MC1 to MCn. Alternatively, at least one dummy memory cell is provided to reduce an electric field between the drain select transistor DST and the memory cells MC1 to MCn. As more dummy memory cells are provided, reliability of an operation for the memory block BLKb is improved, however, the size of the memory block BLKb increases. As less memory cells are provided, the size of the memory block BLKb may be reduced, however, the reliability of the operation for the memory block BLKb may be reduced.

In order to efficiently control at least one dummy memory cell, each of the dummy memory cells may have a required threshold voltage. Before or after an erase operation for the memory block BLKb, program operations for all or a part of the dummy memory cells may be performed. When the erase operation is performed after the program operation is performed, the dummy memory cells may have the required threshold voltage by controlling a voltage applied to the dummy word lines connected to the respective dummy memory cells.

Figure 6:
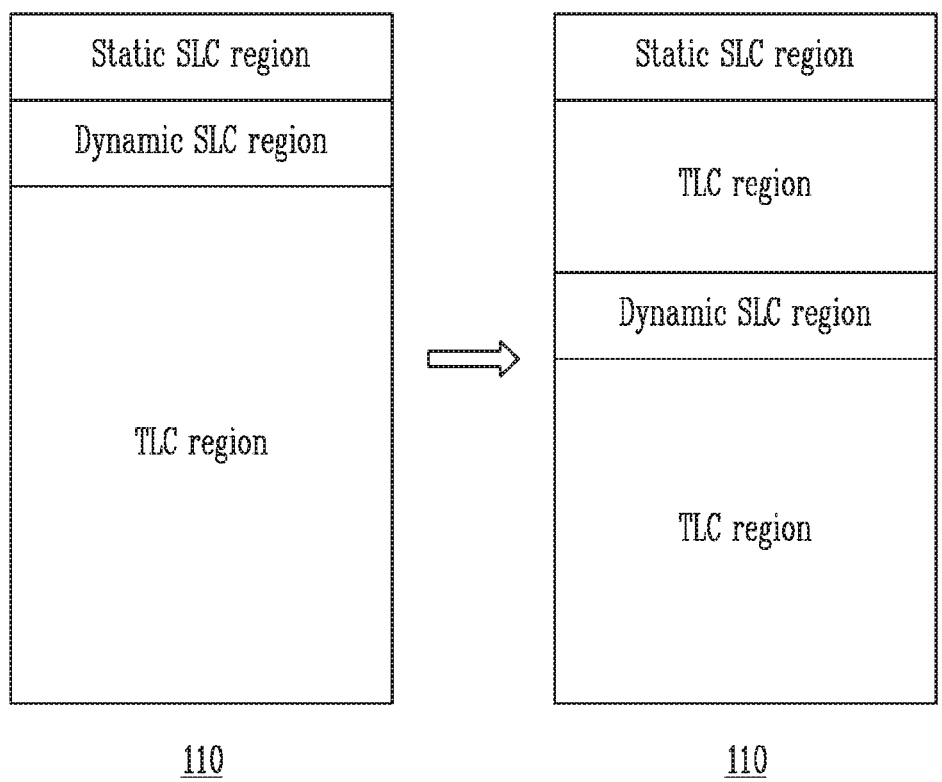
FIG. 6 is a diagram illustrating a region division of the memory cell array according to a program operation.

FIG. 6 is a diagram illustrating a region division of the memory cell array according to the program operation.

Referring to FIG. 6, the memory cell array 110 may divide a storage space into a static SLC region, a dynamic SLC region, and a TLC region according to a program method during the program operation.

For example, the static SLC region and the dynamic SLC region are regions programmed in an SLC program method during the program operation, and the TLC region is a region programmed in a TLC program method during the program operation.

In order to improve a program operation speed and stability during the program operation, the memory device receives data to be programmed, and then programs the received data in the static SLC region or the dynamic SLC region in the SLC program method. Thereafter, during the background operation of the memory device, the data stored in the static SLC region or the dynamic SLC region is read, and the read data is programmed in the TLC region.

Therefore, the program operation speed and data reliability may be improved by performing the program operation in the SLC program method during a program operation, and data storage efficiency may be improved by programming the data, which is stored in the static SLC region or the dynamic SLC region, in the TLC region in the TLC program method during the background operation (for example, the garbage collection operation.

The static SLC region is a region fixed as much as a set data capacity of the memory cell array 110, and the dynamic SLC region is a region variable according to a capacity of data to be programmed. Accordingly, the dynamic SLC region may be adjacent to the static SLC region or may be disposed between the TLC regions.

Figure 7:
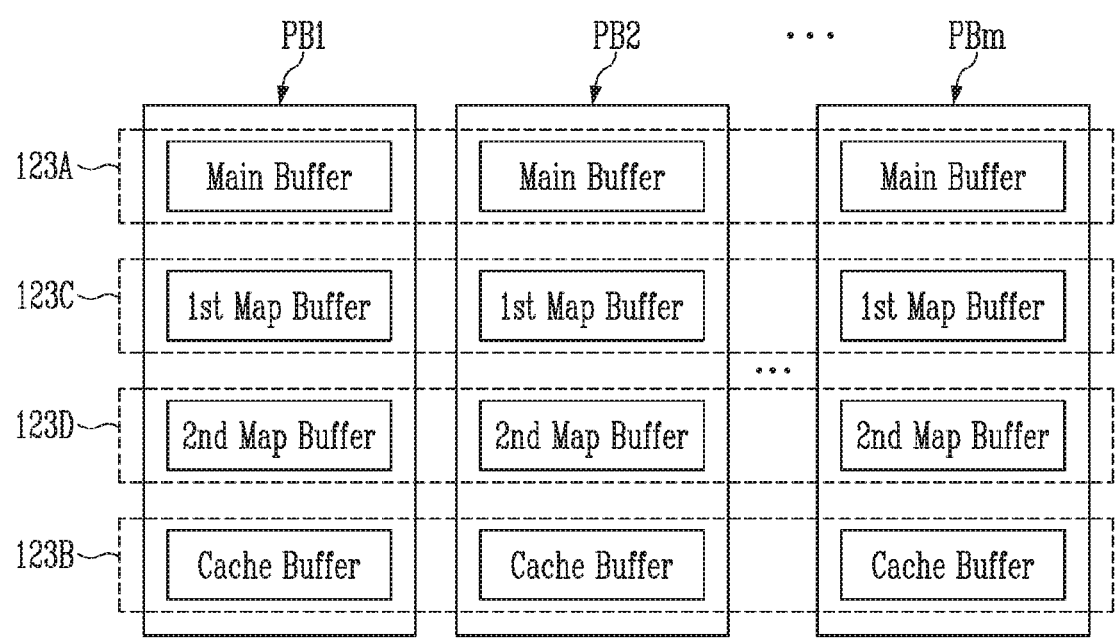
FIG. 7 is a diagram illustrating page buffers included in a page buffer group of FIG. 2.

FIG. 7 is a diagram illustrating the page buffers included in the page buffer group of FIG. 2.

Each of the plurality of page buffers PB1 to PBm may include a main buffer Main Buffer, a cache buffer Cache Buffer, a first map buffer 1st Map Buffer, and a second map buffer 2nd Map Buffer.

The main buffer Main Buffer of each of the page buffers PB1 to PBm may be referred to as a main buffer stage 123A, the cache buffer Cache Buffer of each of the page buffers PB1 to PBm may be referred to as a cache buffer stage 123B, the first map buffer 1st Map Buffer of each of the page buffers PB1 to PBm may be referred to as a first map buffer stage 123C, and the second map buffer 2nd Map Buffer of each of the page buffers PB1 to PBm may be referred to as a second map buffer stage 123D.

During the program operation, the main buffer stage 123A may adjust a potential level of the bit lines BL1 to BLm of FIG. 2 according to stored data. During the read operation, the main buffer stage 123A may sense a potential or a current amount of the bit lines BL1 to BLm and store the sensed data.

During the program operation, the cache buffer stage 123B may receive data to be programmed, which is received from the outside of the memory device 100 (for example, the memory controller 200 of FIG. 1), temporarily store the data, and transmit the temporarily stored data to the main buffer stage 123A. During the read operation, the cache buffer stage 123B may receive the sensed data from the main buffer stage 123A and transmit the sensed data to the outside of the memory device 100 (for example, the memory controller 200 of FIG. 1).

During the map data load operation, the first map buffer stage 123C stores the second map data among the map data stored in the system block.

During the map data search operation, the second map buffer stage 123D stores a logical block address (LBA) received from the outside of the memory device 100 (for example, the memory controller 200 of FIG. 1).

During the map data search operation, each of the page buffers PB1 to PBm may search whether the map data corresponding to the LBA stored in the second map buffer stage 123D is stored in the first map buffer stage 123C.

Figure 8:
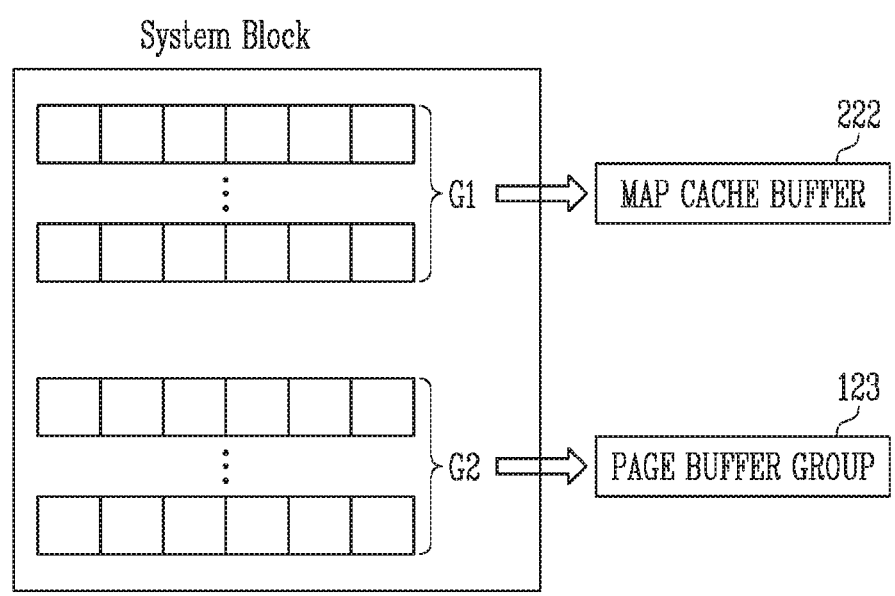
FIG. 8 is a diagram illustrating a load operation of map data according to an embodiment of the present disclosure.

FIG. 8 is a diagram illustrating a load operation of the map data according to an embodiment of the present disclosure.

Referring to FIG. 8, during the load operation of the map data, the map data stored in a system block System Block of the memory device may be read and stored in the map cache buffer 222 of the memory controller and the page buffer group 123 of the memory device.

For example, first map data G1 among the map data stored in the system block System Block of the memory device may be read by the page buffer group 123 of the memory device, and the read first map data G1 may be transmitted to the map cache buffer 222 of the memory controller and stored. Second map data G2 among the map data stored in the system block System Block may be read by the page buffer group 123 and may be stored.

For example, the first map data G1 may be cold data having a relatively low number of accesses among the map data stored in the system block System Block, and the second map data G2 may be hot data having a relatively high number of accesses among the map data stored in the system block System Block.

In another embodiment, the first map data G1 may be map data first read by the storage capacity of the map cache buffer 222 among the map data stored in the system block System Block, and the second map data G2 may be map data read by the map data storage capacity of the page buffer group 123 after the first map data G1 is read among the map data stored in the system block System Block.

Figure 9:
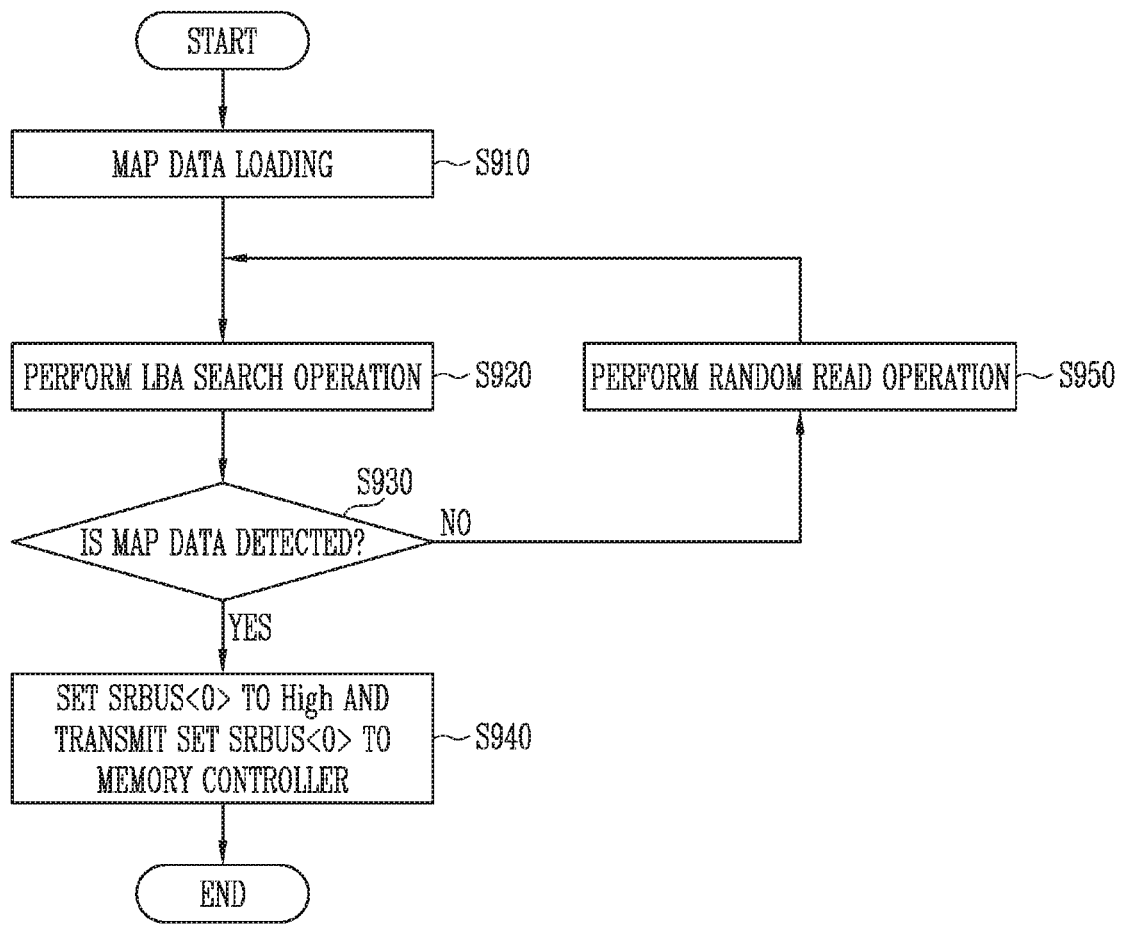
FIG. 9 is a flowchart illustrating a map data search operation according to an embodiment of the present disclosure.

FIG. 9 is a flowchart illustrating the map data search operation according to an embodiment of the present disclosure.

Figure 10:
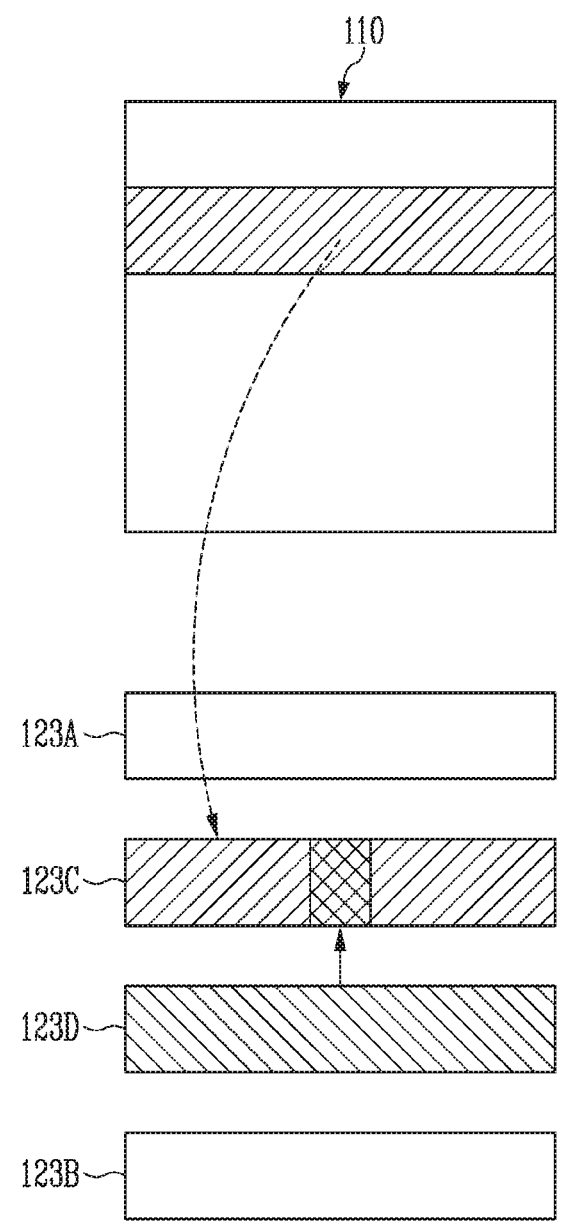
FIG. 10 is a diagram illustrating movement of the map data during a map data search operation according to an embodiment of the present disclosure.

FIG. 10 is a diagram illustrating movement of the map data during the map data search operation according to an embodiment of the present disclosure.

Figure 11:
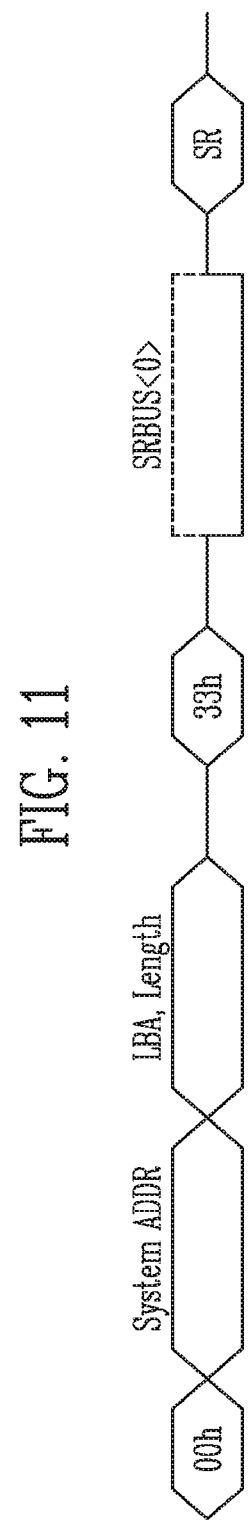
FIG. 11 is a diagram illustrating signals transmitted between a memory controller and a memory device during the map data search operation according to an embodiment of the present disclosure.

FIG. 11 is a diagram illustrating signals transmitted between the memory controller and the memory device during the map data search operation according to an embodiment of the present disclosure.

The map data search operation according to an embodiment of the present disclosure is described with reference to FIGS. 1, 2, and 9 to 11 as follows.

In step S910, when a command 00h, a system address System ADDR, the logical block address LBA, and address length information Length of the logical block address are received from the memory controller 200, the memory device 100 reads map data corresponding to the system address System ADDR among the map data stored in the system block of the memory cell array 110 and stores the map data in the map cache buffer 222 of the memory controller 200 and the first map buffer stage 123C of the page buffer group 123. For example, the first map data among the read map data may be stored in the map cache buffer, and the second map data may be stored in the first map buffer stage 123C.

In addition, the logical block address LBA is stored in the second map buffer stage 123D according to the received logical block address LBA and address length information Length of the logical block address.

In step S920, a command 33h corresponding to the map data search operation is received from the memory controller 200, and the control logic 130 of the memory device 100 checks whether the map data corresponding to the logical block address LBA stored in the second map buffer stage 123D is stored in the first map buffer stage 123C, in response to the command 33h.

As a result of the check of step S920 described above, when the map data corresponding to the logical block address LBA stored in the second map buffer stage 123D is stored in the first map buffer stage 123C, "Yes" in step S930, the control logic 130 of the memory device 100 sets a status register signal SRBUS<0> to logic high and transmits the status register signal SRBUS<0> to the memory controller 200.

The memory controller 200 may recognize that the logical block address LBA transmitted to the memory device 100 is matched (corresponds) to the second map data loaded in the first map buffer stage 123C, based on the status register signal SRBUS<0> of logic high.

Thereafter, a status check operation may be performed, and a result of the status check operation may be output to the memory controller 200 as status register information SR.

As a result of the check of step S920 described above, when the map data corresponding to the logical block address LBA stored in the second map buffer stage 123D is not stored in the first map buffer stage 123C, "No" in step S950, the control logic 120 of the memory device 130 controls the peripheral circuits 120 to read other map data stored in the system block (for example, BLK1). Therefore, new second map data is loaded to the first map buffer stage 123C. Thereafter, the operation is repeated from step S920 described above.

As described above, according to an embodiment of the present disclosure, when the logical block address LBA is received from the memory controller 200, the map data corresponding to the received logical block address LBA may be searched among the second map data stored in the first map buffer stage 123C of the page buffer group 123.

When the memory controller 200 receives the logical block address LBA from the host 300, the memory controller 200 may perform the map data search operation among the first map data stored in the map cache buffer 222 of the memory controller 200 according to the received logical block address LBA, or ay perform the map data search operation among the second map data stored in the first map buffer stage 123C by transmitting the logical block address LBA to the memory device. For example, when the logical block address LBA received from the host 300 corresponds to the cold data, the map data search operation may be performed among the first map data stored in the map cache buffer 222 of the memory controller 200, and when the logical block address LBA received from the host 300 corresponds to the hot data, the map data search operation may be performed among the second map data stored in the first map buffer stage 123C.

Figure 12:
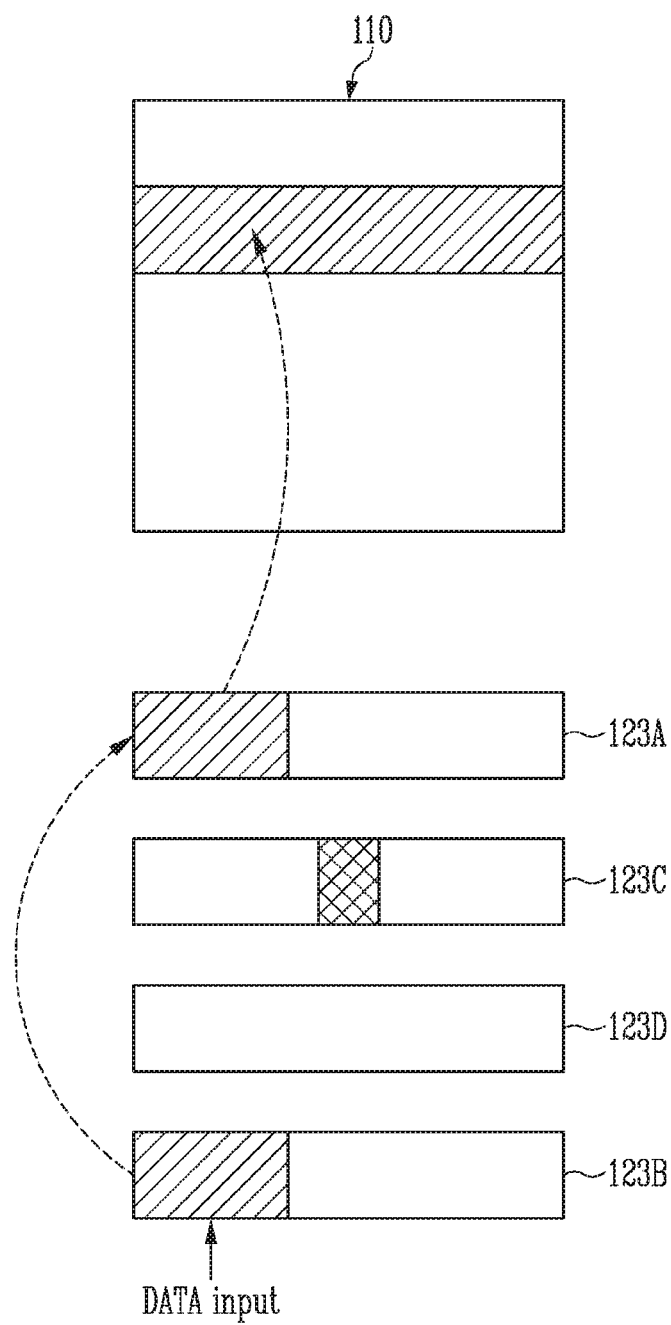
FIG. 12 is a diagram illustrating movement of data during an update operation of data according to an embodiment of the present disclosure.

FIG. 12 is a diagram illustrating movement of data during an update operation of data according to an embodiment of the present disclosure.

Figure 13:
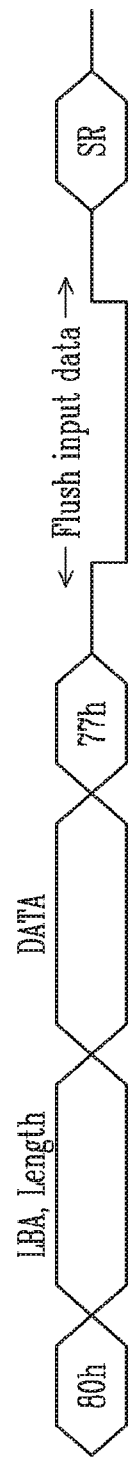
FIG. 13 is a diagram illustrating signals transmitted between the memory controller and the memory device during the program operation of data according to an embodiment of the present disclosure.

FIG. 13 is a diagram illustrating signals transmitted between the memory controller and the memory device during the program operation of data according to an embodiment of the present disclosure.

The program operation of data according to an embodiment of the present disclosure is described with reference to FIGS. 1, 2, 12 and 13 as follows.

As a result of the map data search operation according to FIG. 9 described above, when the status register signal SRBUS<0> of logic high is received from the memory device 100, the memory controller 200 transmits a command 80h corresponding to the program operation, the logical block address LBA, the address length information Length of the logical block address, and the normal data DATA to be programmed, to the memory device 100.

The page buffer group 123 of the memory device 100 receives and stores the input normal data. For example, the cache buffer stage 123B of the page buffer group 123 receives and temporarily stores the normal data, and transmits the temporarily stored normal data to the main buffer stage 123A. At this time, the map data matched with the logical block address LBA may remain among the map data stored in the first map buffer stage 123C.

The memory device 100 performs a flush operation of the normal data stored in the main buffer stage 123A, that is, a program operation of storing the normal data, which is stored in the main buffer stage 123A, in a selected region of the memory cell array 110, in response to the specific command 77h.

The program operation may be performed in the SLC program method. That is, the normal data is programmed in the static SLC region or the dynamic SLC region of the storage space of the memory cell array 110 in the SLC program method. Accordingly, during the program operation, each of the page buffers PB1 to PBm of the page buffer group 123 may perform the program operation using only one buffer, that is, a main buffer.

Thereafter, a status check operation according to a program operation result may be performed, and a result of the status check operation may be output to the memory controller 200 as status register information SR.

According to the above-described embodiment of the present disclosure, when the logical block address LBA received from the host 300 is not matched to the map data stored in the map cache buffer 222 of the memory controller 200 and the first map buffer stage 123C of the page buffer group, new map data is read and stored in the first map buffer stage 123C of the page buffer group. In this case, an operation of loading the new map data to the memory controller 200 may be skipped after storing the new map data in the page buffer group, thereby improving the operation speed of the storage device 50.

Figure 14:
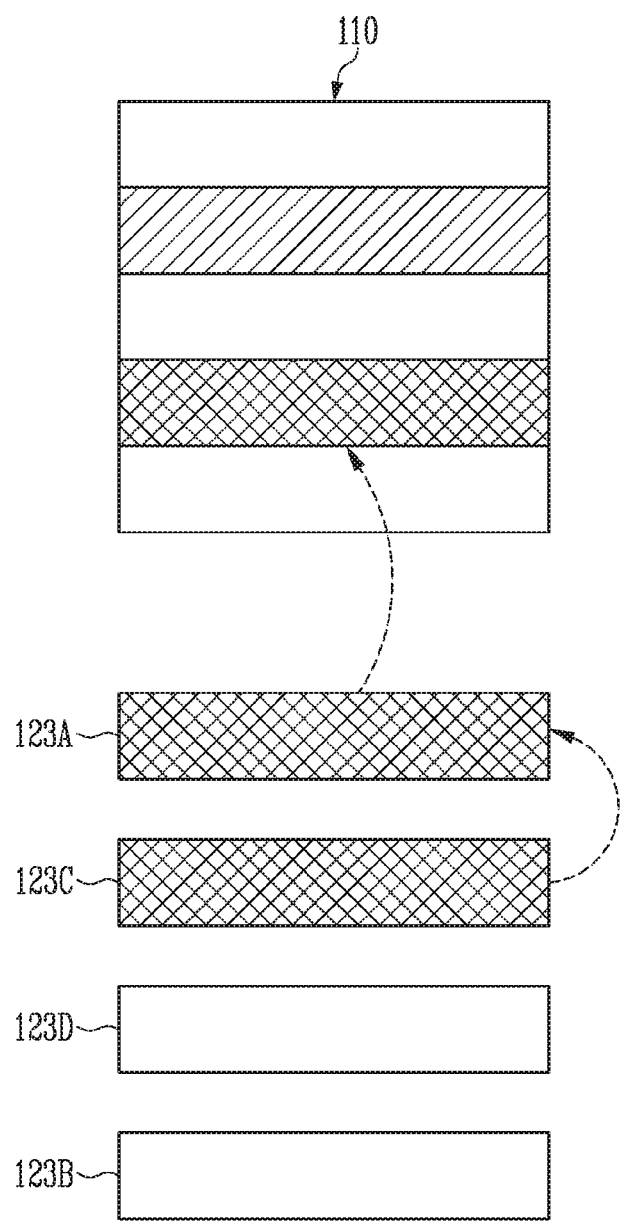
FIG. 14 is a diagram illustrating movement of the map data during a flush operation of the map data according to an embodiment of the present disclosure.

FIG. 14 is a diagram illustrating movement of the map data during the flush operation of the map data according to an embodiment of the present disclosure.

Figure 15:
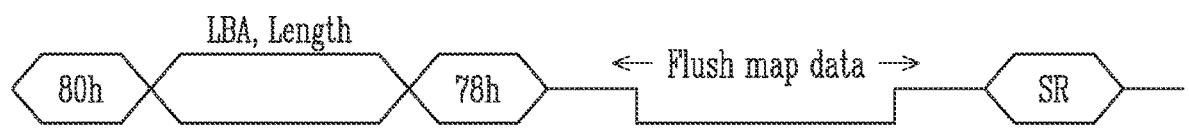
FIG. 15 is a diagram illustrating signals transmitted between the memory controller and the memory device during the flush operation of the map data according to an embodiment of the present disclosure.

FIG. 15 is a diagram illustrating signals transmitted between the memory controller and the memory device during the flush operation of the map data according to an embodiment of the present disclosure.

The flush operation of the map data according to an embodiment of the present disclosure will be described with reference to FIGS. 1, 2, 14, and 15 as follows.

When the update operation of the data of FIGS. 12 and 13 described above is repeatedly performed, the matched map data may be accumulated in the page buffer group 123 of the memory device 100.

For example, a command 80h corresponding to the program operation, the logical block address LBA, and the address length information Length of the logical block address may be continuously transmitted to the memory device 100, and thus the memory device 100 may repeatedly perform the program operation of the normal data several times.

In this case, the matched map data is accumulated in the first map buffer stage 123C of the page buffer group 123.

When the matched map data is accumulated in the first map buffer stage 123C, the memory device 100 performs the flush operation of the map data stored in the first map buffer stage 123C in response to a specific command 78h.

For example, the map data stored in the first map buffer stage 123C is temporarily transmitted to the main buffer stage 123A and is temporarily stored. The peripheral circuits 120 of the memory device 100 performs the flush operation of the map data stored in the main buffer stage 123A, that is, the program operation of storing the map data in the selected region of the memory cell array 110. At this time, the selected region may be a storage region other than the system block BLK1.

The program operation may be performed in the SLC program method. That is, the map data is programmed in the static SLC region or the dynamic SLC region of the storage space of the memory cell array 110 in the SLC program method. Accordingly, during the program operation, each of the page buffers PB1 to PBm of the page buffer group 123 may perform the program operation using only one buffer, that is, the main buffer.

Thereafter, a status check operation according to a program operation result may be performed, and a result of the status check operation may be output to the memory controller 200 as status register information SR.

According to the above-described embodiment of the present disclosure, during the flush operation of the map data, the map data stored in the page buffer group 123 is programmed in the selected storage region of the memory cell array 110. Therefore, an operation of receiving the map data from the memory controller 200 does not occur, and thus the operation speed of the storage device 50 may be improved.

Figure 16:
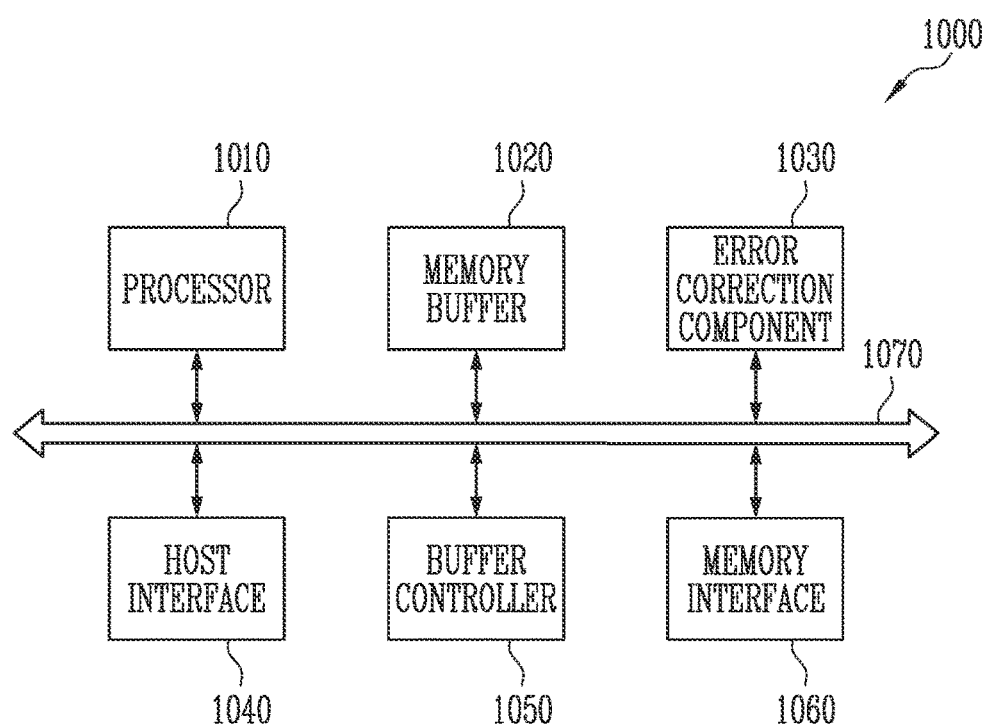
FIG. 16 is a diagram illustrating another embodiment of a memory controller of FIG. 1.

FIG. 16 is a diagram illustrating another embodiment of the memory controller of FIG. 1.

Referring to FIG. 16, the memory controller 1000 is connected to a host Host and the memory device. The memory controller 1000 is configured to access the memory device in response to the request from the host Host. For example, the memory controller 1000 is configured to control the write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error correction component (ECC) 1030, a host interface 1040, a buffer controller 1050, a memory interface 1060, and a bus 1070.

The bus 1070 may be configured to provide a channel between components of the memory controller 1000.

The processor 1010 may control an overall operation of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the FTL. The FTL may receive the LBA using the map data and convert the LBA into the PBA. The FTL may perform an address conversion operation using the map data stored in the memory buffer 1020.

The processor 1010 is configured to randomize data received from the host Host. For example, the processor 1010 may randomize the data received from the host Host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store the map data. The memory buffer 1020 may store data processed by the processor 1010. The memory buffer 1020 may include a static RAM (SRAM) or a dynamic RAM (DRAM).

The ECC 1030 may perform error correction. The ECC 1030 may perform error correction encoding (ECC encoding) based on data to be written to the memory device through memory interface 1060. The error correction encoded data may be transferred to the memory device through the memory interface 1060. The ECC 1030 may perform error correction decoding (ECC decoding) on the data received from the memory device through the memory interface 1060. For example, the ECC 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection express (PCI express), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

For example, the memory controller 1000 might not include the memory buffer 1020 and the buffer controller 1050.

For example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

For example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and might not interfere with each other or affect each other. The data bus may be connected to the host interface 1040, the buffer controller 1050, the ECC 1030, and the memory interface 1060. The control bus may be connected to the host interface 1040, the processor 1010, the buffer controller 1050, the memory buffer 1202, and the memory interface 1060.

Figure 17:
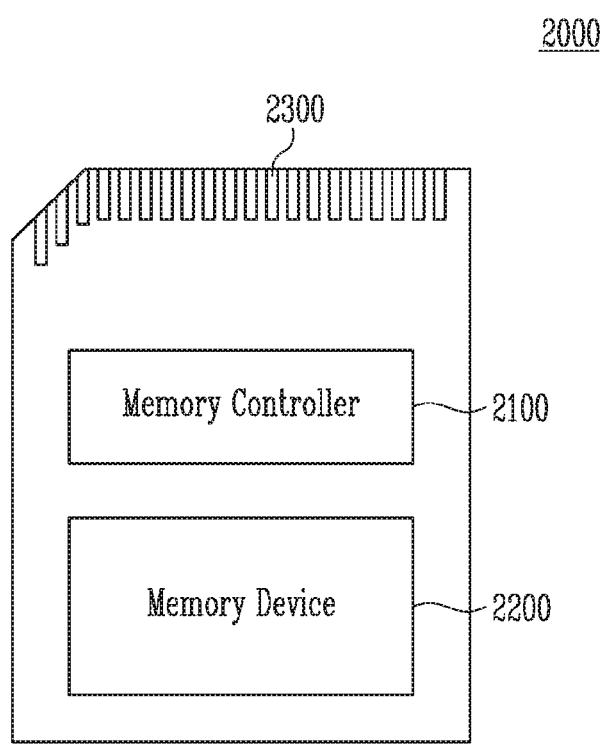
FIG. 17 is a block diagram illustrating a memory card system to which the storage device according to an embodiment of the present disclosure is applied.

FIG. 17 is a block diagram illustrating a memory card system to which the storage device according to an embodiment of the present disclosure is applied.

Referring to FIG. 17, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

For example, the memory controller 2100 may include components such as a random access memory (RAM), a processor, a host interface, a memory interface, and an ECC.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe. For example, the connector 2300 may be defined by at least one of the various communication standards described above.

For example, the memory device 2200 may be configured of various non-volatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 18:
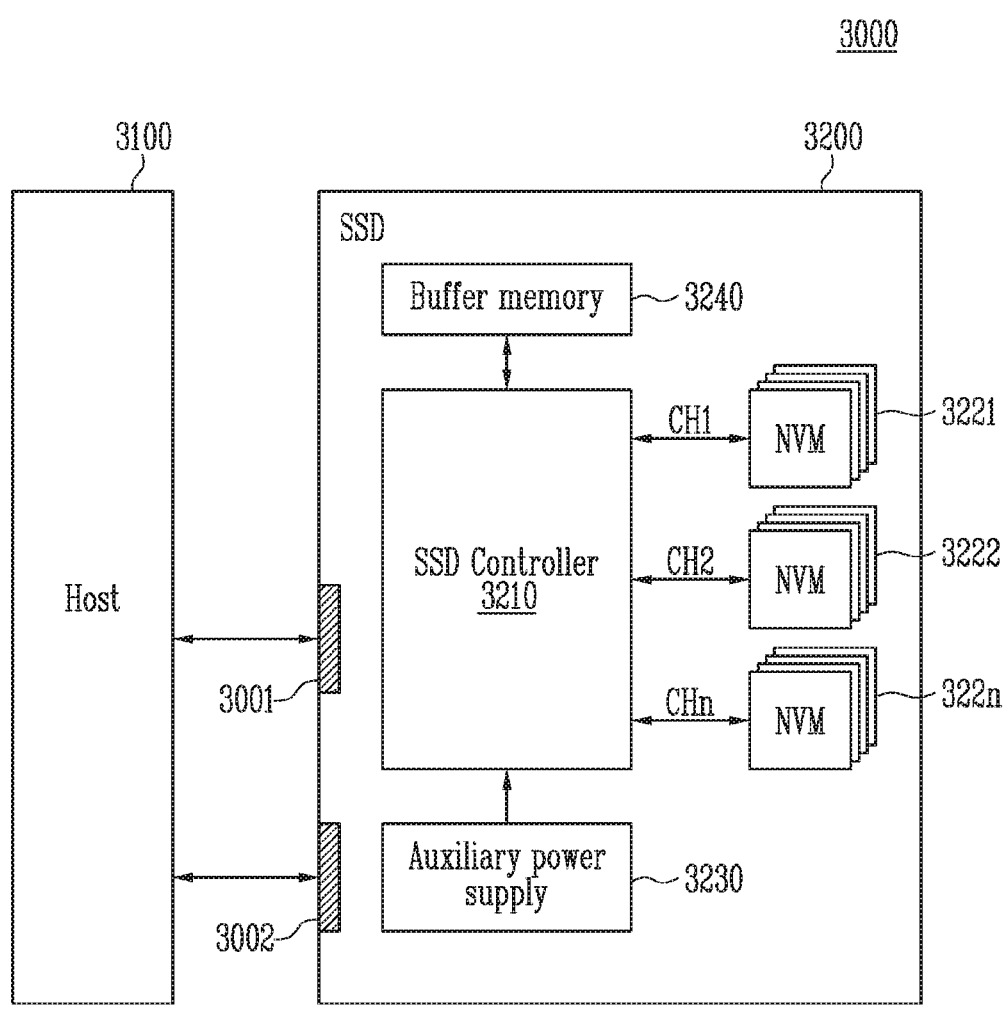
FIG. 18 is a block diagram illustrating a solid state drive (SSD) system to which the storage device according to an embodiment of the present disclosure is applied.

FIG. 18 is a block diagram illustrating a solid state drive (SSD) system to which the storage device according to an embodiment of the present disclosure is applied.

Referring to FIG. 18, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322*n*, an auxiliary power device 3230, and a buffer memory 3240.

According to an embodiment of the present disclosure, the SSD controller 3210 may perform the function of the memory controller 200 described with reference to FIG.

The SSD controller 3210 may control the plurality of flash memories 3221 to 322*n* in response to the signal SIG received from the host 3100. For example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (MCM), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), Fire-Wire, a universal flash storage (UFS), Wi-Fi, Bluetooth, and an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. For example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM.

Figure 19:
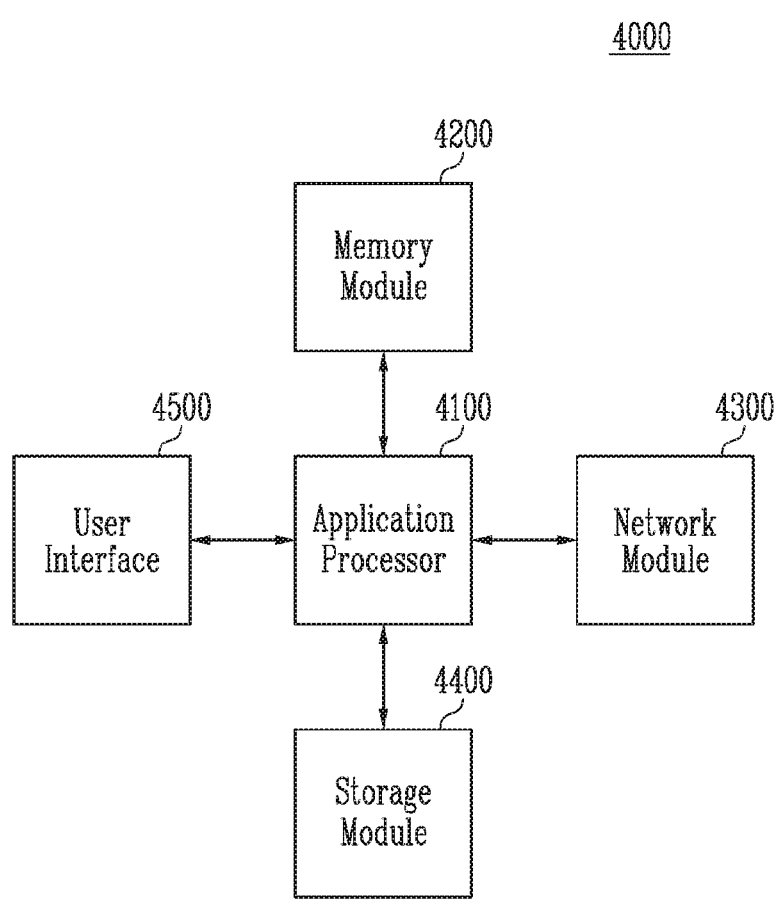
FIG. 19 is a block diagram illustrating a user system to which the storage device according to an embodiment of the present disclosure is applied.

FIG. 19 is a block diagram illustrating a user system to which the storage device according to an embodiment of the present disclosure is applied.

Referring to FIG. 19, the user system 4000 includes an application processor 4100, a memory module 4200, a network module 4300, a storage module 4400, and a user interface 4500.

The application processor 4100 may drive components, an operating system (OS), a user program, or the like included in the user system 4000. For example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of non-volatile memory devices, and the plurality of non-volatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although the detailed description of the present disclosure describes specific embodiments, various modifications may be possible without departing from the scope and technical spirit of the present disclosure. Therefore, the scope of the present disclosure should not be limited to the above-described embodiments, and should be determined by the equivalents of the claims of the present disclosure as well as the following claims.

What is claimed is:

1. A storage device comprising:
   a memory device including a memory cell array that stores normal data and map data; and
   a memory controller configured to control overall operation, including program operation, read operation, and erase operation, of the memory device in response to requests from a host,
   wherein the memory device is configured to, during a map data load operation, transmit first map data to the memory controller by reading the first map data among the map data stored in the memory cell array, and transmit second map data having a higher access level than the first map data to a page buffer group of the memory device by reading the second map data among the map data, and
   wherein the page buffer group comprises a first map buffer stage storing the second map data by reading the second map data among the map data stored in the memory cell array and a second map buffer stage storing a logical block address received from the memory controller.

2. The storage device of claim 1, wherein the memory controller includes a memory buffer, wherein the memory buffer is configured to store the first map data received from the memory device during the map data load operation.

3. The storage device of claim 1, wherein the first map data is cold data having a relatively low number of accesses among the map data, and the second map data is hot data having a relatively high number of accesses among the map data.

4. The storage device of claim 1, wherein the page buffer group comprises:
   a main buffer stage configured to at least one of sense data stored in the memory cell array and temporarily store data to be programmed in the memory cell array; and
   a cache buffer stage configured to at least one of output data stored in the main buffer stage to the memory controller, and transmit the data to be programmed received from the memory controller to the main buffer stage.

5. The storage device of claim 4, wherein the memory controller is configured to receive the logical block address together with the request from the host, and transmit the logical block address to the memory device when the received logical block address corresponds to the second map data.

6. The storage device of claim 5, wherein the page buffer group is configured to perform a map data search operation of searching for whether search map data corresponding to the logical block address received from the memory controller and stored in the second map buffer stage is included in the second map data stored in the first map buffer stage.

7. The storage device of claim 6, wherein the memory device is configured to transmit a status register signal of a specific logic level to the memory controller when the search map data is determined to be included in the second map data during the map data search operation, and
the memory controller is configured to recognize that the logical block address is matched to the second map data stored in the first map buffer stage based on the status register signal.

8. The storage device of claim 7, wherein the memory device is configured to store map data matched to the logical block address among the second map data, which is stored in the first map buffer stage, in the memory cell array.

9. The storage device of claim 6, wherein the memory device is configured to, in response to determining that the search map data is not included in the second map data during the map data search operation, store new second map data in the first map buffer stage by reading the new second map data among the map data stored in the memory cell array, and perform the map data search operation again.

10. The storage device of claim 1, wherein the memory cell array includes a single-level cell region and a triple-level cell region, and
the single-level cell region is programmed using a single-level cell program method, and the triple-level cell region is programmed using a triple-level cell program method.

11. The storage device of claim 10, wherein the storage device is configured to, during a program operation of the normal data or the map data, program the normal data or the map data in the single-level cell region, and
during a background operation, read the normal data or the map data stored in the single-level cell region, and program the read normal data or map data in the triple-level cell region.

12. A method of operating a storage device, the method comprising:
reading first map data and second map data having a higher access level than the first map data among map data stored in a system block of a memory cell array;
transmitting the first map data to a memory controller, and storing the first map data in a memory buffer of the memory controller;
storing the second map data in a first map buffer stage included in a page buffer group of a memory device;
receiving a logical block address from the memory controller to the page buffer group, and storing the logical block address in a second map buffer stage included in the page buffer group; and
performing a map data search operation of searching whether search map data corresponding to a received logical block address is included in the second map data.

13. The method of claim 12, further comprising:
transmitting a specific signal to the memory controller in response to determining that the search map data is included in the second map data as a result of the map data search operation; and reading new second map data among the map data stored in the system block and storing the new second map data in the page buffer group in response to determining that the search map data is not included in the second map data as the result of the map data search operation.

14. The method of claim 13, further comprising:
transmitting the logical block address and the normal data to be programmed from the memory controller to the memory device during a normal data program operation;
programming the normal data in the memory cell array; and
performing a map data flush operation of storing map data corresponding to the logical block address among the second map data in the memory cell array.

15. The method of claim 14, wherein the memory cell array includes a single-level cell region and a triple-level cell region, and
the single-level cell region is programmed in a single level cell program method, and the triple-level cell region is programmed in a triple level cell program method.

16. The method of claim 15, wherein the normal data or the map data corresponding to the logical block address is programmed in the single-level cell region of the memory cell array.

17. The method of claim 12, wherein the first map data is cold data having a relatively low number of accesses among the map data, and the second map data is hot data having a relatively high number of accesses among the map data.

18. A method of operating a storage device, the method comprising:
storing first map data among map data stored in a system block in a memory controller, and storing second map data having a higher access level than the first map data among the map data in a first map buffer stage included in a page buffer group of the memory device, during a map data load operation;
receiving a logical block address from the memory controller by the memory device, storing the logical block address in a second map buffer stage included in the page buffer group, and searching whether search map data corresponding to the received logical block address is included in the second map data, during a map data search operation;
receiving normal data and the logical block address from the memory controller by the memory device, storing the normal data in a memory cell array, and then leaving remaining map data corresponding to the logical block address among the second map data in the page buffer group, during a data program operation; and
storing the map data, left remaining in the page buffer group, in the memory cell array during a map data flush operation.

19. The method of claim 18, wherein the first map data is cold data having a relatively low number of accesses among the map data, and the second map data is hot data having a relatively high number of accesses among the map data.

20. The method of claim 18, wherein the memory cell array includes a single-level cell region and a triple level cell region,
the single-level cell region is programmed in a single-level cell program method, the triple-level cell region is programmed in a triple level cell program method, and the normal data or the map data, which is left remaining in the page buffer group, is programmed in the single level cell region of the memory cell array.

* * * * *